May 29, 1956
J. B. COX
2,747,624
SAW CHAIN WITH SNAP RING FASTENERS
Filed Aug. 17, 1953
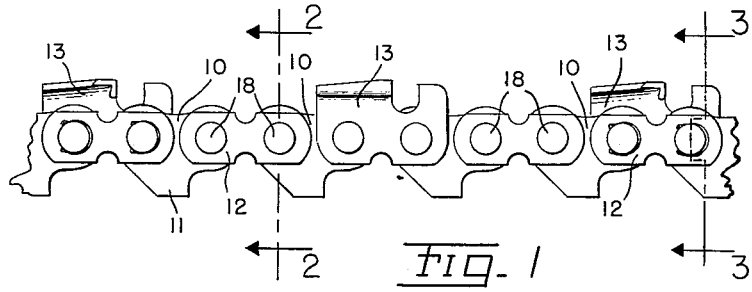
Fig. 1
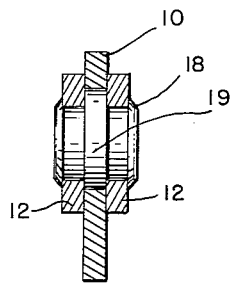
Fig. 2
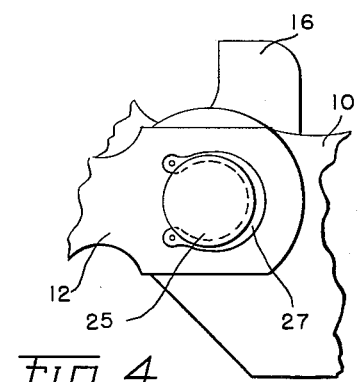
Fig. 4
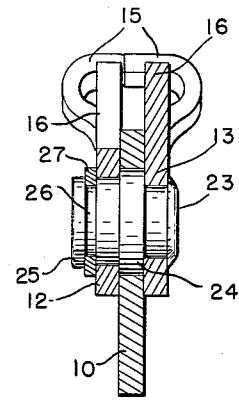
Fig. 3
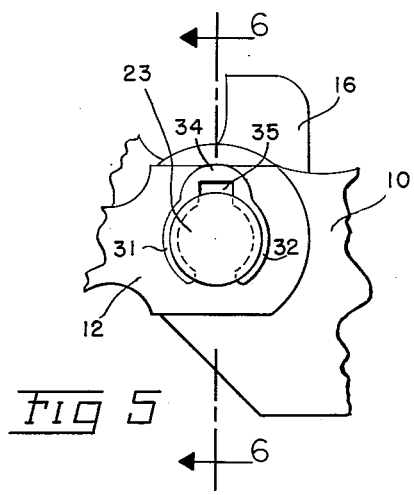
Fig. 5
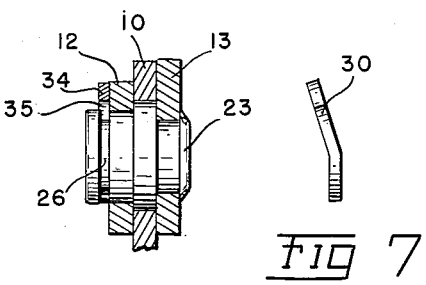
Fig. 6
Fig. 7
*INVENTOR.*
JOSEPH B. COX
BY
Buckhorn and Cheatham
ATTORNEYS United States Patent Office 2,747,624
Patented May 29, 1956

2,747,624

SAW CHAIN WITH SNAP RING FASTENERS

Joseph B. Cox, Portland, Oreg., assignor, by mesne assignments, to Oregon Saw Chain Corp., a corporation of Oregon Application August 17, 1953, Serial No. 374,589

1 Claim. (Cl. 143—135)

The present invention relates to saw chains and more particularly to a new and improved arrangement for connecting together certain of the links of the saw chain.

The saw chains most prevalently used today for cutting wood and like materials are provided within links having a reversely bent or curved tooth portion thereon defining a cutting edge extending transversely of the chain. The tooth portions are elongated longitudinally of the chain whereby the teeth may be resharpened a number of times, but nevertheless the tooth portions of the links are frequently worn completely away long before the remaining parts of the chain are worn to the end of their useful life. Frequently, also, one or more of the teeth of a chain may be damaged during operation of the saw as, for example, when a hard metal object or stone is struck by the teeth and, unless replaced, the useful function of the damaged tooth is lost.

The principal object of the present invention is to provide a new and improved arrangement for connecting together links of a saw chain whereby individual links may be quickly and easily replaced.

More specifically, it is an object of the invention to provide an arrangement for connecting the cutter links to a saw chain whereby the cutter links may be easily and quickly removed and replaced without the use of special tools.

Still another object of the invention is to provide means for connecting a pair of links of a saw chain together, which permits disconnection of the links without damage thereto.

Still other objects and advantages of the invention will become more apparent hereinafter.

In accordance with an illustrated embodiment of the present invention, overlapping links of a saw chain are mounted on a pivot pin extending through the links and are retained on the pin by a snap ring seated in a recess formed in the pin, the ring engaging the outer surface of one of the links.

For a more detailed description of the invention, reference is made to the following specification taken in conjunction with the accompanying drawings wherein:

Fig. 1 is a side elevation of a fragmentary length of saw chain embodying the present invention;

Fig. 2 is an enlarged cross-sectional view taken substantially along line 2—2 of Fig. 1;

Fig. 3 is a cross-sectional view taken substantially along line 3—3 of Fig. 2;

Fig. 4 is an enlarged side elevation of a portion of the chain shown in Fig. 1;

Fig. 5 is a fragmentary side elevation of links of a chain illustrating a further embodiment of the invention;

Fig. 6 is a fragmentary cross-sectional view taken substantially along line 6—6 of Fig. 5; and Fig. 7 is an elevation showing a detail of the fastening means of the embodiment shown in Figs. 5 and 6.

In Fig. 1 is illustrated a saw chain comprising a plurality of longitudinally spaced apart center links 10 having sprocket engaging root portions 11 formed on the lower ends thereof. The links 10 are pivotally connected together by means of oppositely disposed side links or side plates 12 and 13. The side plates 12 are identical to each other while the side plates 13 are formed with a hook shaped tooth 15 on the upper end thereof and each is provided with a depth gauge 16 ahead of the tooth. Such a tooth forms the subject of my Patent 2,508,784, issued May 23, 1950.

The center links 11 and side plates 12, 13 are connected together by means of pivot pins or rivets in a manner to now be described. In Fig. 2 is illustrated the heretofore conventional manner of permanently riveting together the links of the chain. In Fig. 2 opposite pairs of side plates 12 are shown pivotally connected to the adjacent center links 10 by means of rivets 18. The central portion of the rivets are provided with an enlarged annular shoulder 19 having a width very slightly greater than the thickness of the center links 10 and a diameter slightly less than the cooperating opening provided in the link so that the link may pivot freely thereabout. The side plates 12 are provided with openings for cooperatively receiving the opposite ends of the rivets 18, the ends of the rivets being spun over the side plates to fix the side plates against the shoulders provided by the enlarged, intermediate rivet portion 19. As may be seen by reference to my patent mentioned above, the cutter links 13 may be connected to the center links of the chain and the opposite side plates 12 in the same manner. However, this is of disadvantage when it is desired to replace the worn or damaged cutter link since the rivet can only be removed by chiselling off the spun over end which may result in damage to a side plate, or by use of special punches such as that illustrated in my copending patent application Serial No. 247,048, filed September 18, 1951. However, the side plates 12 ordinarily do not have to be replaced during the life of a chain, and opposite pairs of side plates 12 of the chain of the invention may be permanently connected by means of rivets 18 to the adjacent center links, as shown.

Referring now more particularly to Figs. 3 and 4, in accordance with the invention the cutter links 13 are connected in the chain by means of pivot pins 23 and releasable lock means which is adapted to cooperatively engage the pin and a link of the chain to secure the pin in position. As in the case of the rivets 18, the central portion of the pins 23 are provided with an enlarged annular shoulder 24 having a width slightly greater than the width of the center links 10 and a diameter slightly less than the cooperating opening of the center links. Preferably the pivot pins 23 are permanently secured to the cutter links 13, the cutter links being provided with openings for cooperatively receiving one of the ends 22 of the pins, the corresponding ends of the pins being spun over the cutter links to fix the links against the shoulder formed by the enlarged pin portion 24. It is preferred that the cutter links 13 be permanently secured to the pivot pins 23 in the manner illustrated so that there will be no play between the pivot pins and the cutter links secured thereto for it has been found that, should any play develop, the opening in the cutter link is rapidly enlarged by the resulting swedging action. This permits the link to tilt relative to the pivot pin whereupon the stress of the tooth is imposed on only a small portion of the spun over head with the result that the head is easily sheared off. Thus, if any play develops between a cutter link and the pivot pins, generally and within a very short time the pivot pin heads are sheared off and the chain rendered inoperative. The opposite end portion 25 of a pin projects through a cooperating opening in the side plate 12 opposite the cutter link. Provided in the surface of the pivot pin end portion 25 adjacent the outer surface of the plate 12 is an annular recess 26 in which is seated an oxbow shaped snap ring 27 which engages the outer surface of the side plate 12 to fix the same against the shoulder of the enlarged rivet portion 24. As will be evident, a cutter link 13 may be easily and quickly removed from the chain by merely removing the snap rings 27 from the pins 23 connecting the link to the chain and sliding the pins 23 out of the cooperating openings in the opposite side plate 12 and center links 10 whereafter a new cutter link with pins 23 previously secured thereto may be mounted in the chain. Because of the stress imposed upon the side plate portion of a cutting link during the cutting action, the maximum permissible diameter of the pivot pin end portion 23 is limited by the necessity of maintaining a certain minimum amount of material in the side plate portion of the cutting link between the pivot pin opening therein and adjacent peripheral edge of the side plate portion so as to provide sufficient strength to resist the stress and prevent cracking of the side plate portion. The size of the side plate portion of a cutting link 13 is limited, of course, by practical considerations.

Preferably the rivet end portion 25 which extends through a side plate 12 is of greater diameter than the rivet end portion 22 but yet of smaller diameter than the center portion 24. This will permit the use of a larger size snap ring 27 within the result that a greater area of engagement will be provided between the ring and pin 23 and the ring and side plate 12 to make the assembly more secure.

Obviously other forms of resilient lock means could be used to secure the side plates 12 to the pivot pins 23. For the purpose of illustration, in Figs. 5, 6 and 7 an arrangement is shown utilizing a lock ring 30 that may be easily and conveniently attached or removed from the chain. The arrangement of the various links of the chain and the pivot pin 23 is as in the previously described embodiment. The lock ring 30 comprises a pair of semi-circular arms 31, 32 adapted to be received in the pin recess 26. The arms 31, 32 are connected at one end by a bridge 34 which is spaced outwardly from the periphery of the pin so as to provide a space or slot 35 in which a tool such as a screw driver may be inserted to pry the ring from engagement in the recess 26. Preferably the ring 30 is bent transversely medially of the arms 31, 32 as shown in Fig. 6 so that it will be in biased engagement with the walls of the recess 26 and the side plate 12 when the ring is in operative position on a chain.

Having illustrated and described preferred embodiments of the invention, it should be apparent to those skilled in the art that the invention permits of modifications in arrangements and details. I claim as my invention all such modifications as come within the true spirit and scope of the appended claim.

I claim:

In a saw chain, a center link, a side plate, and a cutter tooth disposed on opposite sides of said link, a pivot pin extending transversely through said link, side plate and cutting tooth and pivotally connecting the same, said pin comprising an enlarged, annular central portion cooperatively fitting in a circular opening formed in said link, the opposite end portions of said pin being of reduced diameter relative to said central portion whereby said central portion defines a pair of shoulders, one of said end portions extending through a cooperative opening in said cutting tooth, the terminal part of said one end portion being expanded against the outer surface of said cutting tooth securely to bind the same against the corresponding shoulder of said pivot pin, the opposite end portion of said pivot pin extending through a cooperating opening in said side plate and being of a diameter intermediate the diameter of said one end portion and said central portion, said opposite end portion having a circumferential groove therein spaced from said central portion by the thickness of said side plate, and a snap ring of larger outer diameter than said opposite end portion seated in said groove and engaging the outer surface of said plate to secure the same on said pin.

References Cited in the file of this patent

UNITED STATES PATENTS

| | | |
|---|---|---|
| 1,137,459 | Campbell | Apr. 27, 1915 |
| 1,947,421 | Nize | Feb. 13, 1934 |
| 2,487,803 | Heimann | Nov. 15, 1949 |
| 2,508,784 | Cox | May 23, 1950 |
| 2,595,787 | Heimann | May 6, 1952 |